United States Patent
Norton et al.

(10) Patent No.: US 12,397,433 B2
(45) Date of Patent: Aug. 26, 2025

(54) CONTINUUM ARM ROBOT SYSTEM

(71) Applicant: ROLLS-ROYCE plc, London (GB)

(72) Inventors: Andrew D Norton, Derby (GB); Matteo Russo, Nottingham (GB); Abdelkhalick Mohammad, Nottingham (GB)

(73) Assignee: ROLLS-ROYCE plc, London (GB)

( * ) Notice: Subject to any disclaimer, the term of this patent is extended or adjusted under 35 U.S.C. 154(b) by 215 days.

(21) Appl. No.: 18/075,877

(22) Filed: Dec. 6, 2022

(65) Prior Publication Data
US 2023/0191610 A1    Jun. 22, 2023

(30) Foreign Application Priority Data
Dec. 22, 2021   (GB) ..................................... 2118715

(51) Int. Cl.
*B25J 9/16* (2006.01)
*B25J 9/06* (2006.01)
*B25J 19/06* (2006.01)

(52) U.S. Cl.
CPC .............. *B25J 9/1682* (2013.01); *B25J 9/06* (2013.01); *B25J 9/163* (2013.01); *B25J 9/1633* (2013.01); *B25J 19/066* (2013.01)

(58) Field of Classification Search
None
See application file for complete search history.

(56) References Cited

U.S. PATENT DOCUMENTS

| | | | |
|---|---|---|---|
| 6,636,781 B1* | 10/2003 | Shen | B25J 9/065 703/2 |
| 2015/0081092 A1* | 3/2015 | Jacobsen | B25J 5/007 901/1 |

(Continued)

FOREIGN PATENT DOCUMENTS

| | | |
|---|---|---|
| EP | 4 134 207 A1 | 2/2023 |
| GB | 2552019 A | 1/2018 |

OTHER PUBLICATIONS

Jun. 29, 2022 Search Report issued in British Patent Application No. GB2118715.8.

(Continued)

*Primary Examiner* — Adam R Mott
*Assistant Examiner* — Alan Lindsay Ostrow
(74) *Attorney, Agent, or Firm* — Oliff PLC

(57) ABSTRACT

A control system for a compliant robotic system including at least two compliant robots having actuator packs, the control system including: an individual local control system associated with each actuator pack, the local control system providing control signals to the actuator causing movement within the robots, an overall control system controlling the overall motion of robots when proximate within a workspace, the overall control signal providing signals to the actuators associated with the robots, so as to cause linked movement of the continuum arm robots, and wherein each individual control system is provided with a clock synchronized with the other, and wherein the overall control system is provided with a redundancy control system that limits the motion of the compliant robots within certain degrees of freedom, so that the motion of the at least two complaint robots does not conflict when operating under the overall control system.

21 Claims, 8 Drawing Sheets

(56) References Cited

U.S. PATENT DOCUMENTS

Figure 1B:
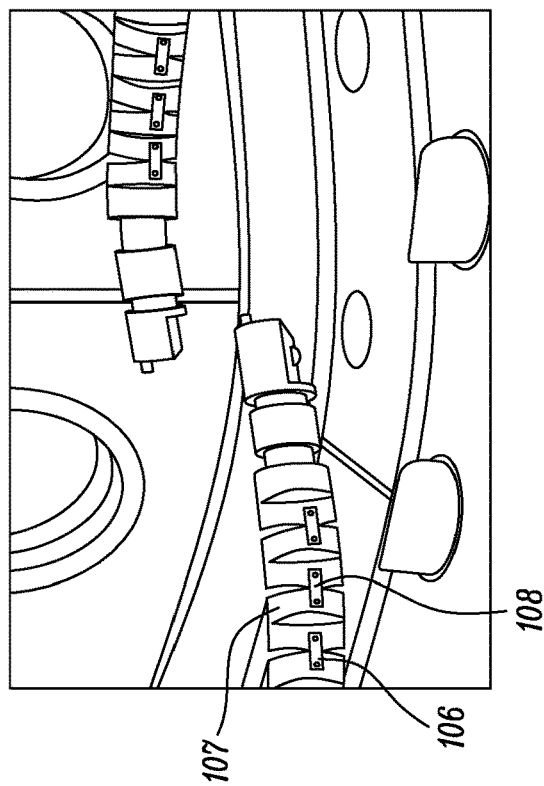

2015/0251316 A1* 9/2015 Smith .................... B25J 9/1625
901/46
2017/0049298 A1* 2/2017 Hunter ................... A61B 5/067
2019/0167363 A1* 6/2019 Cohen .................... A61B 1/303

OTHER PUBLICATIONS

May 23, 2023 Extended Search Report issued in European Patent Application No. 22211698.0.

* cited by examiner

CONTINUUM ARM ROBOT SYSTEM

This specification is based upon and claims the benefit of priority from UK Patent Application Number 2118715.8 filed on 22 Dec. 2021, the entire contents of which are incorporated herein by reference.

BACKGROUND

Overview of the Disclosure

The disclosure relates to a system of linked compliant robots. In particular, the disclosure relates to the control system for multiple joined compliant robots.

Background of the Disclosure

Continuum arm or snake arm robots are of growing interest in a number of applications. This is because the robots can be manipulated into spaces in which other robotic systems or human operators cannot readily access. This is due to the ability to manipulate the body with a number of degrees of freedom so that the end tool can be positioned accurately and easily. This positioning is controlled by actuators which manipulate the tendons within the robot so that each joint of the arm can be individually controlled with a high degree of positional accuracy.

Most arm robots have 6 degrees of freedom or less. However, if a task requires a greater amount of dexterity the number of degrees of freedom required is increased. In such cases the number of degrees of freedom needs to be increased. This increase in the number of degrees of freedom means that the arms are able to operate in confined areas, for example in maintenance of complex structures or for use in minimally invasive surgery. Continuum arm robots are designed along two main paths: Firstly, there are snake-like robots, which consist of multiple rigid-link sections that are connected by either a rigid R/U/S (Revolute/Universal/Spherical) joints or by a compliant joint. Each section is composed of one or more segments and controlled independently from the others with on-board or remote actuation. Secondly, there are continuum robots, which consist of a compliant backbone whose local and global deformation is controlled by one or more actuators.

Despite the functionality there are issues with the current designs of highly compliant robots, which result from the number of joints required in the robot arm. As a consequence of these joints the robot arm suffers from a low degree of stiffness when compared to conventional 6 degrees of freedom robots. This reduced stiffness results in a reduced load carrying capacity as well reducing the interaction that the arm can have with the environment within which it is operating. The current state of the art aims to overcome this by "freezing" the system through locking the actuator or by the addition of stiffening means to the backbone. This can work for shorter length robotic arms, however, when employed on longer length robots the arms act like long cantilever beams and the deflection of the beams causes significant position and navigation issues. This limits the use of such robots to lightweight tasks for risk of damaging the robot and/or the object that the robot is working on. Therefore, there is a requirement for an improved continuum arm robot system to overcome these issues.

SUMMARY OF THE DISCLOSURE

According to a first aspect of the disclosure there is provided a control system for a complaint robotic system comprising at least two compliant robots each compliant robot having their own actuator pack, the control system comprising:

an individual local control system associated with each of the actuator pack, the local control system providing control signals to the actuator to cause movement within the associated compliant robots, an overall control system which controls the overall motion of robots when they are proximate within a workspace, the overall control signal providing signals to the actuators associated with the at least two compliant robots, so as to cause linked movement of the continuum arm robots, and wherein each individual control system is provided with a clock, and the clocks of each individual control system is synchronized with the other, and wherein the overall control system is provided with a redundancy control system that limits the motion of the compliant robots within certain degrees of freedom, so that the motion of the at least two complaint robots does not conflict when operating under the overall control system.

At least one of the complaint arm robots may be provided with a clamping system for linking it to at least the other compliant robot within the system, the mechanism of the clamping system being controlled by either the local controller associated with the arm provided with the clamping system or the overall controller.

The clamping system may be provided with an interlock, which if broken restricts the movement of the robot system, and when connected initiates the redundancy control system.

The compliant arm robots may be provided with sensors that provide signals to both the local controllers and to the overall control system.

The local control systems may be programmed with a kinematic model of the respective robot in motion, which is used to compensate the signal to the actuator when a movement command is inputted.

The overall control system may be provided with a kinematic model for all of the robots within the system, as well as models for connected systems, which are used to compensate the signals provided to the actuators when movement command is inputted.

Each local controller and the overall controller may be provided on separate computer systems, with the local controllers being linked to the overall controller.

The local controllers and the overall controller may be provided on the same computer system.

The redundancy control system may disengage the required number of motion control actuators from one of the actuator packs.

The redundancy control system may disengage a required number of motion control actuators from each of the actuator packs.

Once the robots are in position the overall control system may place one or more of the compliant robots are placed into an idle state, whilst at least one of the compliant robots remain active, such that an operator is still able to control the motion.

Once the robots are in position the overall control system may place one or more of the compliant robots are placed into a passive control state, whilst at least one of the compliant robots remain active, such that an operator is still able to control the motion.

Once the robots are in position the overall control may maintain all the arms in an active state.

According to a second aspect of the disclosure there is provided a method of controlling multiple complaint robots as discussed, the method comprising:

inserting multiple compliant robots into a workspace, manipulating the movement of the complaint robots using individual local control systems to move the complaint robots to a first desired position, with the complaint robots in the decided position the local control system is shut down and the overall control system takes over the motion control of the complaint robots as part of a system, performing a decided task using the compliant robot system, positioning the robots to a second desired position, disengaging the overall control system and reengaging the local control systems, removing the complaint robots from the workspace.

Once the compliant robots are in their first desired position the complaint robots may be clamped together, and the clamp may be disengaged once the compliant robots are in the second desired position.

Once the compliant robots are in the first desired position a preprogramed connection sequence may be activated which provides an automatic control for clamping the complaint robots together.

Once the compliant robots are in their second desired position a separation sequence may be activated, which provides a means of automatically separating the robots and deactivating the overall control system.

Once the compliant robots are clamped together, the overall control system may place at least one of the complaint robots in an idle state and at least one in an active state.

Once the compliant robots are clamped together, the overall control system may place at least one of the complaint robots in a passive state and at least one in an active state.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DISCUSSION OF THE FIGURES

Figure 1A:
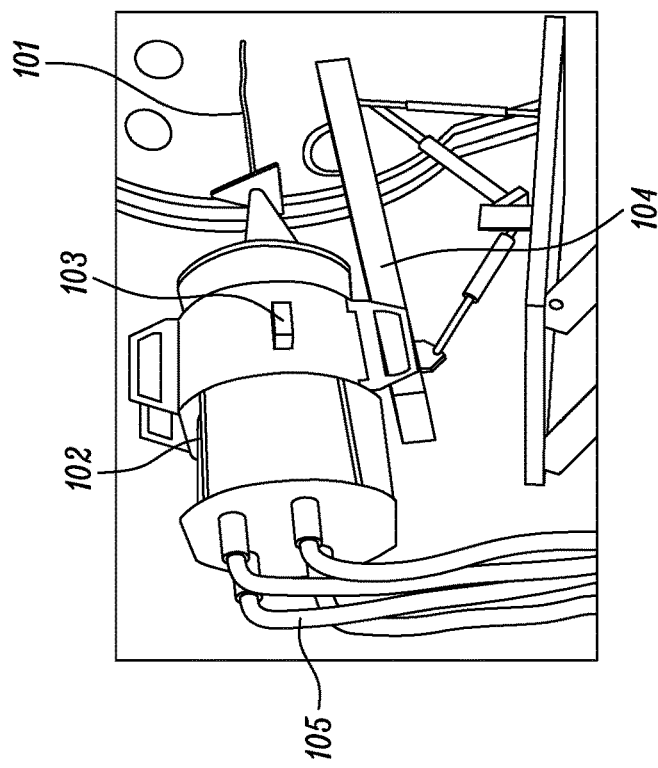
Figure 2:
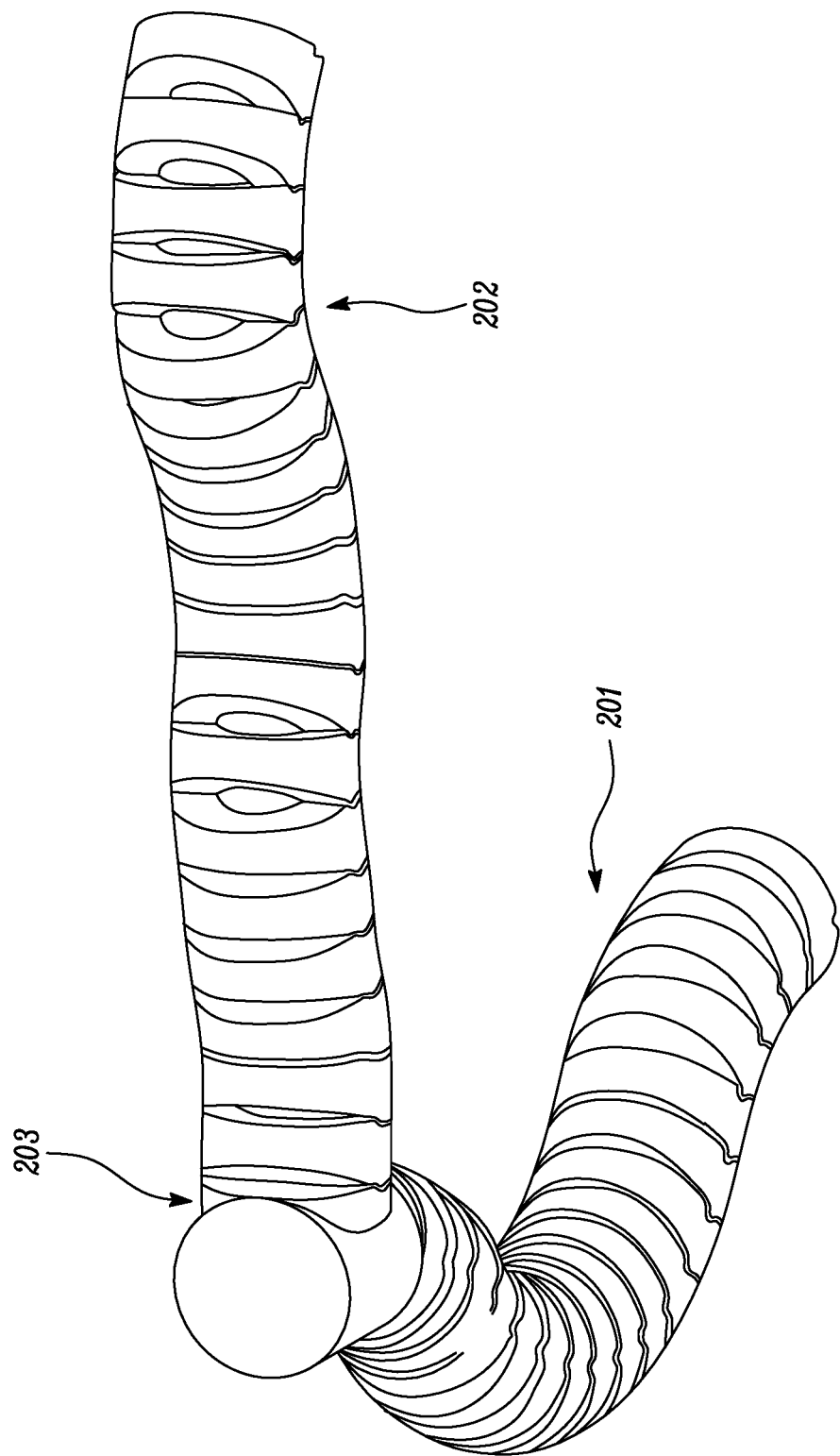
Figure 3:
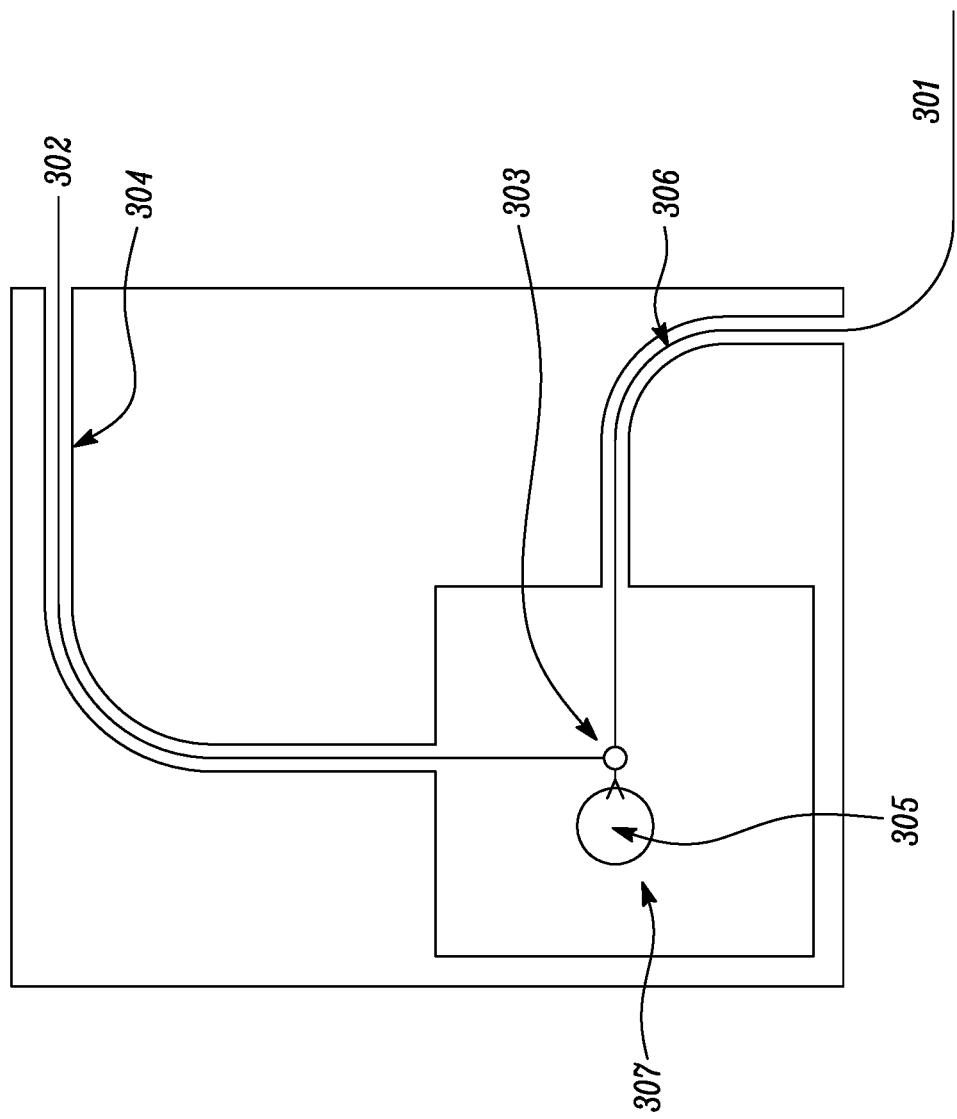
Figure 4B:
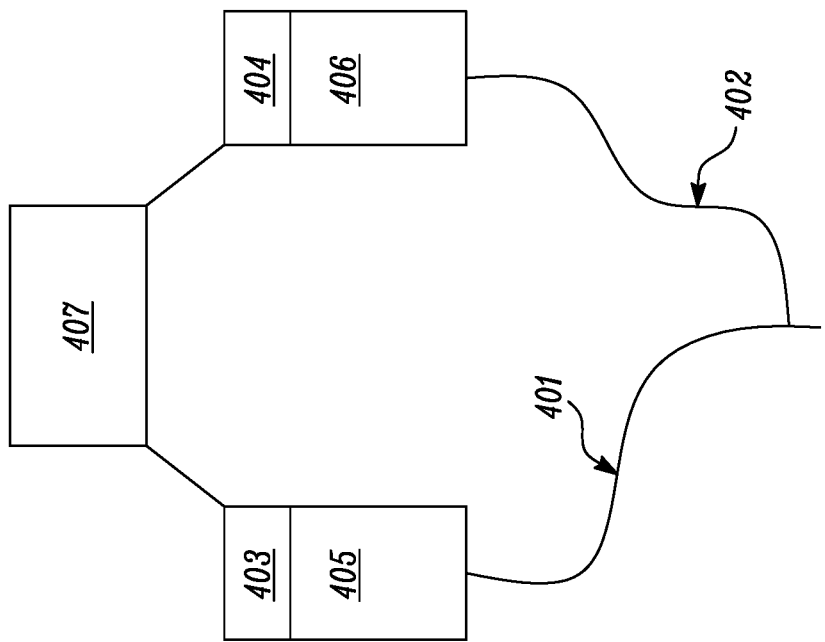
Figure 4A:
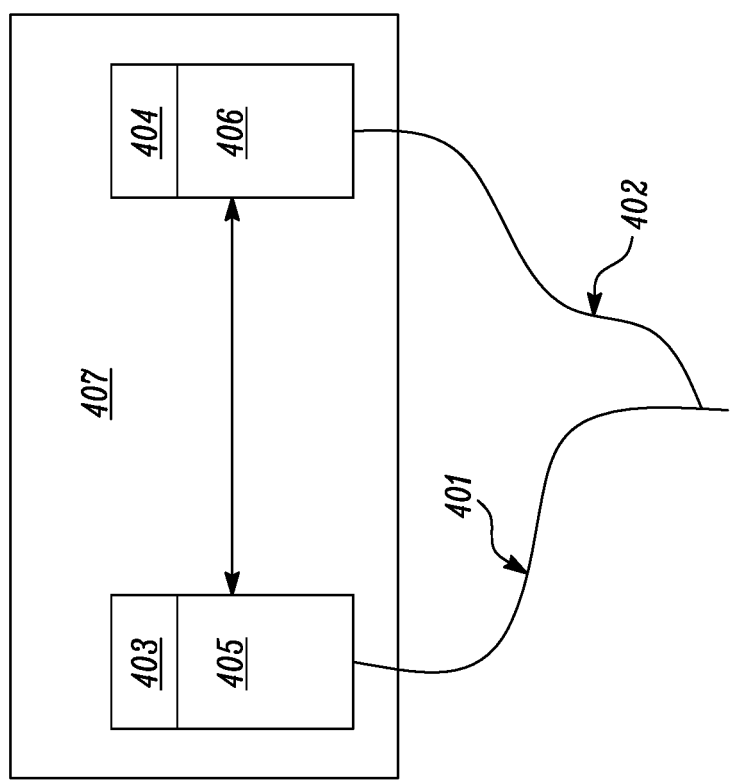
Figure 5:
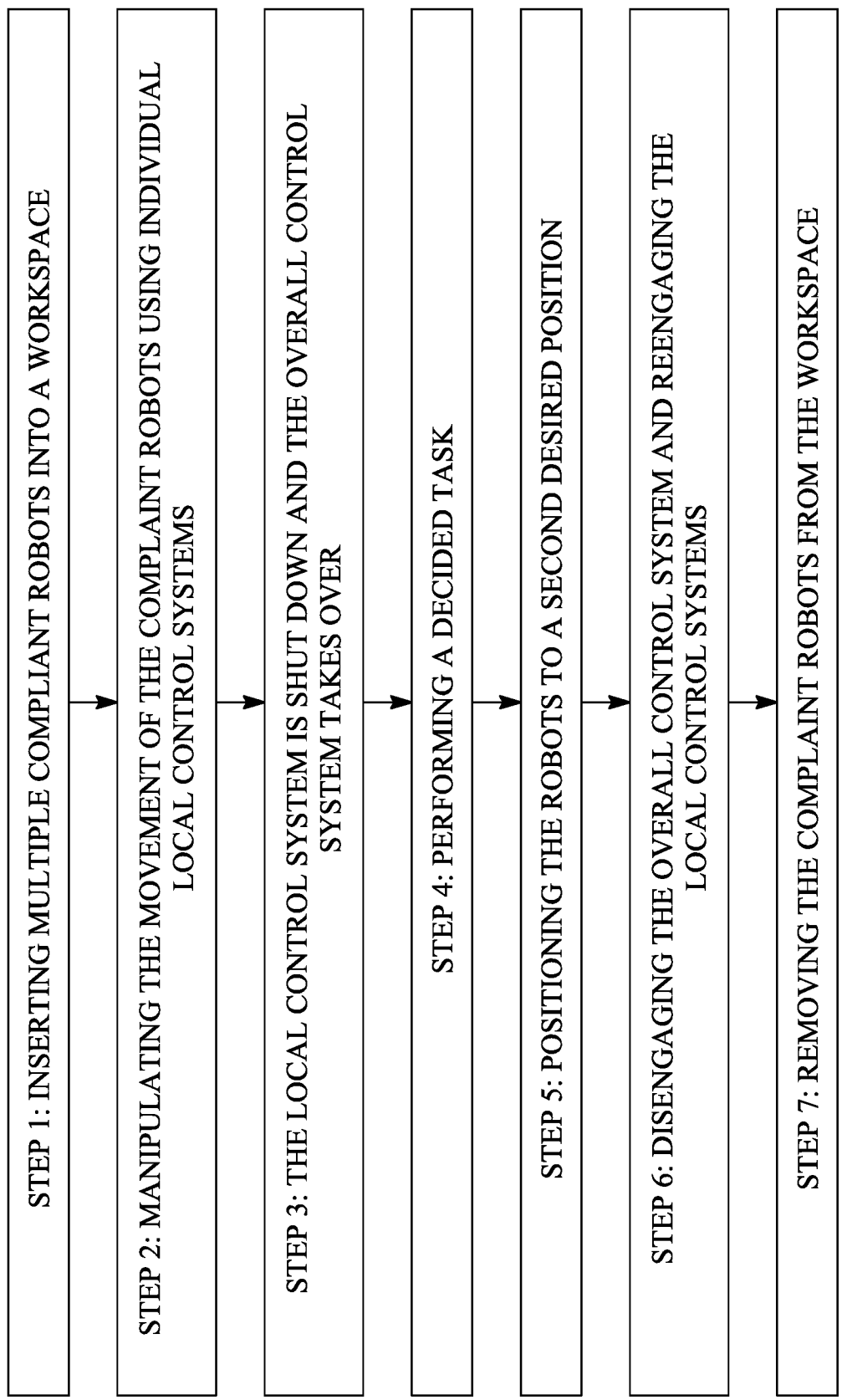
Figure 6:
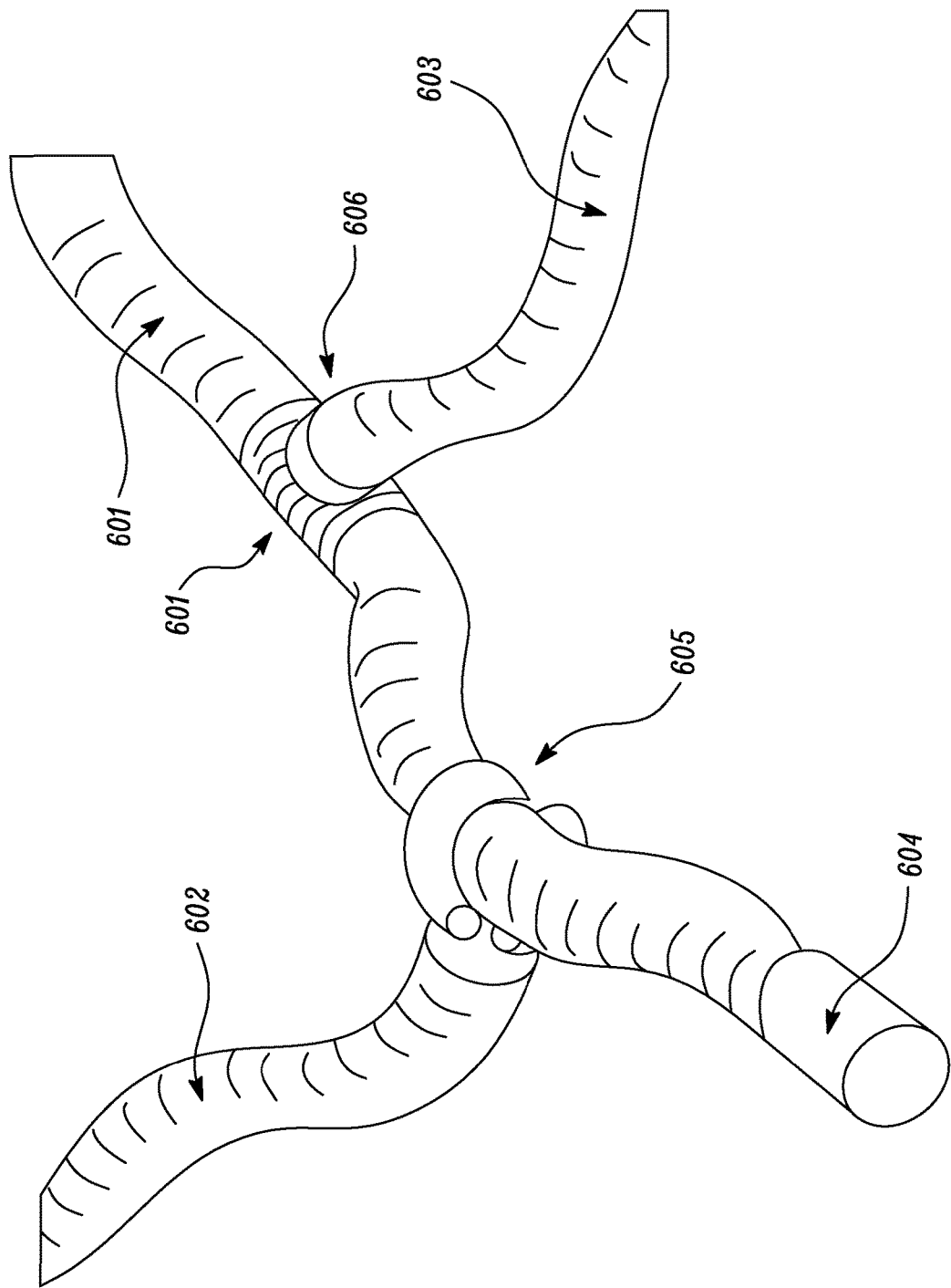
Figure 7:
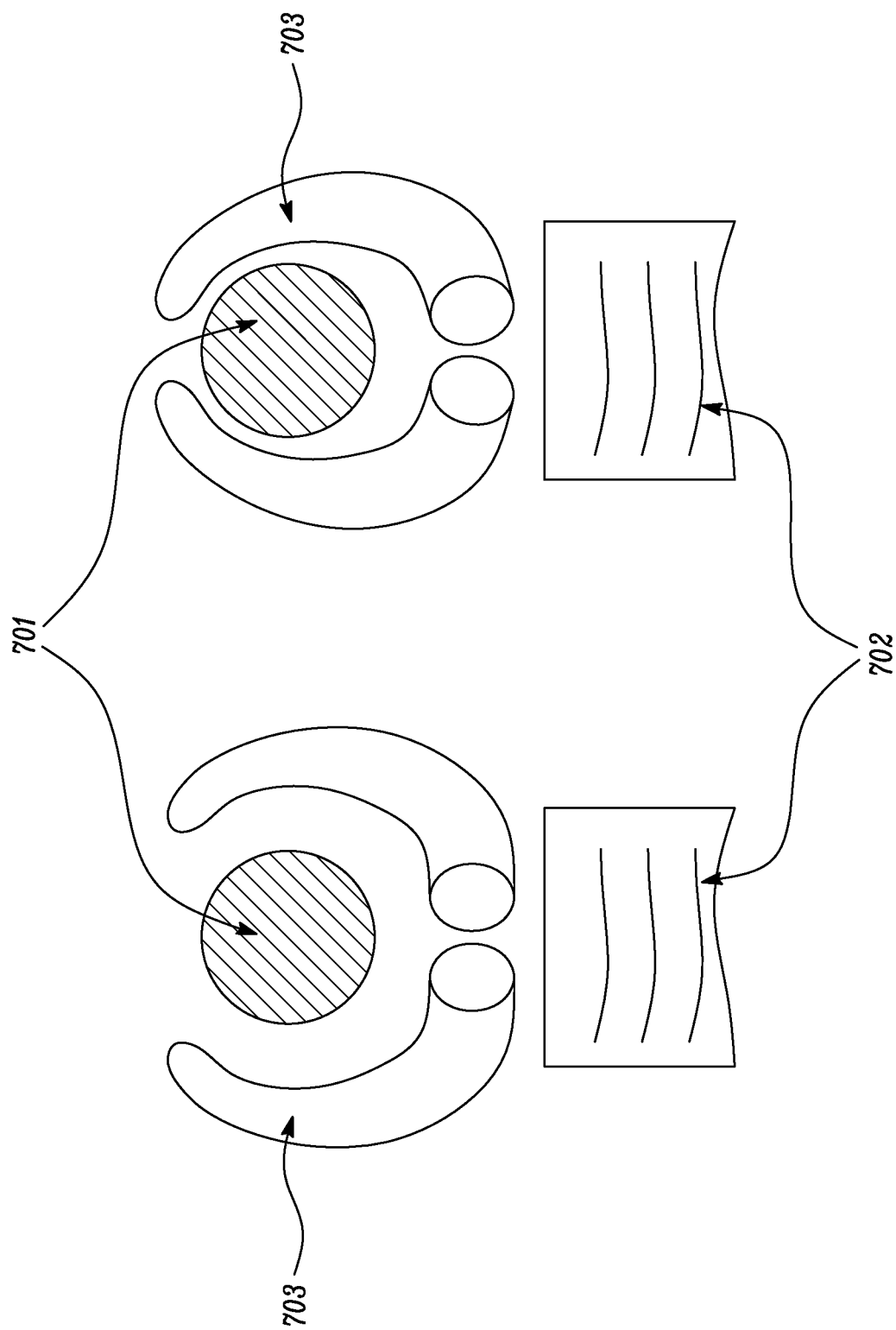
Figure 8:
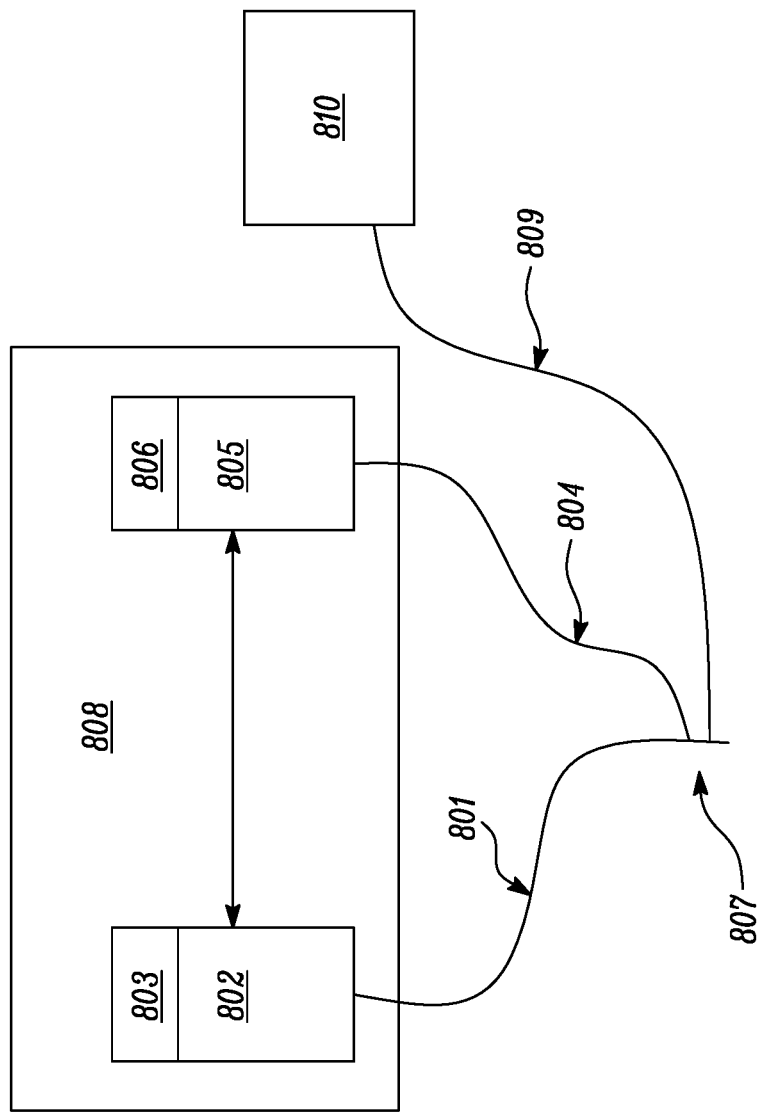

Embodiments will now be described by way of example only, with reference to the Figures, in which:

FIG. 1A presents a prior art example of a cut away of a continuum arm robot;

FIG. 1B presents an example of the joints of a continuum arm robot;

FIG. 2 presents an image of a continuum arm robot system according to the present disclosure;

FIG. 3 presents a schematic of the operation of connected continuum arm robots according to the present disclosure;

FIGS. 4A and 4B present examples of a control systems used to control the at least two arm continuum arm robotic system of the present disclosure;

FIG. 5 presents a flow chart of the operation of a linked continuum arm robotic system of the present disclosure;

FIG. 6 presents an example of a three continuum robot system according to the present disclosure;

FIG. 7 presents an example of the clamping mechanism between the second and first continuum arm robots as presented in FIG. 6; and FIG. 8 presents an example of the control system comprising a three robotic system according to the present disclosure.

DETAILED DESCRIPTION OF THE DISCLOSURE

Aspects and embodiments of the present disclosure will now be discussed with reference to the accompanying figures. Further aspects and embodiments will be apparent to those skilled in the art.

FIG. 1a presents a prior art example of a cut away of a continuum arm robot. The prior art continuum arm robot comprises the continuum arm robot portion 101 permanently integrated and extending out from the actuator pack 102. The actuator pack 102 contains a plurality of independent actuators 103. These actuators are used to modulate the tension within the tendons that run through the continuum arm 101. The tendons are associated with joints within the arm; each of these joints is designed to move in response to a tensioning or relaxing of the tendon associated with the joint. This tensioning or relaxing of the tendon therefore causes a contraction or extension of the joint, which allows the continuum arm to bend. The actuator pack is shown being positioned on a rail or support 104, which is positioned close to the component to be inspected. The actuator is also provided with a plurality of power and signal cables 105 that are used to power and address the actuators. The individual signals across the range of actuators provide control of the joints such that the continuum arm 101 can be directed. Not shown in FIG. 1 is that there is also a need for an operator with a computing device that is linked to the actuator to control movement of the continuum arm and to perform the desired task. As the continuum arm is permanently integrated into the actuator pack if a different tool is required it requires the use of a complete continuum arm robot system including the actuator. The computing device that is connected to the prior art actuator may be any suitable computing system such as a laptop computer featuring the requisite operating software for the robot and a control input such as a joystick, which allows the continuum arm to be controlled.

FIG. 1b shows an example of the joints of a continuum arm robot. The arm comprises multiple joints, which require at least 2 cables per joint. For example, a system having three joints, each having 4 tendons per joint will require 12 actuators to drive. To increase the number of joints either the number of actuators needs to be increased or the number of tendons per joint needs to be reduced. Highlighted joints 106, 107, 108 are able to be manipulated to move in three dimensions. The joints are configured so that joints 106 and 108 are able to flex in the same plane relative to the centre of the arm, whilst the plane that joint 107 is able to move in is offset by 90° to joints 106 and 108. It is through this repeating configuration of alternating joint angles, each of which results in the movement in different orthogonal plane, that allows the arm to be manipulated in three dimensions. Each joint within the arm has a limit to the amount they are able to flex; this is defined by the design of the arm and the materials that are used. The limit of flex in each joint and sets characteristics such as the minimum bending radius and the requirements for the torque that is required to cause a resultant change within the joint. It is the presence of the space in the joints that allows the joint to move and the ease of movement of the joint that results in a low stiffness of the arms in comparison to other robotic arms of the same length. This is because the structural behaviour of a snake-like robotic manipulator can be compared to a cantilever beam under load; this is because the system is fixed on one end to the base with actuation pack and the remainder of the arm is used to navigate through the environment without other points of contact. In this condition, every load applied on the body and/or the tip of the snake-like robot, including its own weight, imposes a significant deflection from the ideal position. At the end of the arm there is positioned a tool or probe that is designed to perform one or more functions once the continuum arm is in position. The heads of the continuum arm robots are often provided with optical systems so that the operator is able to view the head as it is being inserted into the component and to be control the head as it performs its tasks. The optical system is also frequently coupled to an illumination system. The control cables for the tool, electrical power connectors to the illuminations system and optical cables usually are able to run through the centre of the joints within the continuum arm. This has the benefit of protecting the cables form any potential damage. All of these components as well as the arm structure are permanently coupled to the actuator; this means that if the arm fails or has a problem the entire continuum arm robot needs to be replaced.

FIG. 2 presents an image of a continuum arm robot system according to the present disclosure. The continuum arm robots can be the same size. Alternatively, the continuum arm robots can have different lengths and/or thicknesses. The continuum arm robot system features first 201 and second 202 continuum arm robots. Although described as continuum arm robots one of the arms could be a compliant partially robotic arm robot. These continuum arm robots are controlled by their own respective actuator packs. The first continuum arm robot is affixed with an actuator pack for performing the desired task to be performed by the robot system. The second continuum arm robot features a connection mechanism 203 at a point along the continuum arm robot section—in FIG. 2 this is shown at the end of the arm. This connection mechanism is configured to grip the first continuum arm robot at a suitable place to support the first continuum arm robot whilst it performs its desired task. This second continuum arm robot thus is moveable into a suitable position for supporting the first continuum arm robot and allows the system to compensate the load across the multiple channels. As such, the continuum arm robot system does not suffer from such a great deflection as would be the case in a single continuum arm robotic system. By using two continuum arm robots that are coupled so as to brace each other allows for improved static and dynamic behaviour of the system. As both continuum arm robots are movable the operator can move the position of the grip of the first continuum arm robot to any suitable position to carry out its task. For example, this could be close to the tip of the first continuum arm robot or a number of joint sections away from the tip. The presence of a second robotic arm can benefit the system further as it allows for additional tools to be brought into the area as these tools could not be brought in through the channel with a single snake arm robot. The feeds for the tools can be brought through the core of the joint section of the continuum arm robots, so that by utilising this system it is possible to deliver multiple feeds such as air or different gases to a desired area within one operation. Similarly, the use of multiple continuum arm robots within the system can allow for the presence of additional sensors that would not be present with the use of a single arm robot. The length of the robot can be any suitable length. In an embodiment the connecting the two continuum arm robots occurs after the first 6 DoF from the end; this leads to an optimal performance increase.

The head of the continuum arm robots may be provided with sensors such as ultrasonic, cameras, depth sensors. Alternatively, they may be provided with mechanical tools such as grinding or milling tools, or electrical tools such as lasers, or cutting equipment using gas. By utilising multiple continuum arm robots, it is possible to move some of the sensors on the "holding" second continuum arm robot, whilst having a free end-effector on the first continuum arm robot which is dedicated to the operation. This potentially allows more operations or enabling a reduction in external diameter in both robots. Depending on how the robots connect, the connecting robots could be also used to supply pressurized air/liquid, gas, electricity to the tool at the end of the continuum arms. The purpose of the use of the linked continuum arm robots is to increase stiffness and/or payload thanks to the interconnection. Additional advantages of linking the continuum arms include the possibility of "driving/dragging" a main continuum arm with others to enhance its motion range/accuracy and delivering more tools than a single robot through a single access passage would allow.

FIG. 3 presents a schematic of the operation of connected continuum arm robots. In this a first continuum robot 301 is inserted through access passage 305. Once the first continuum arm robot is positioned, or simultaneously with the insertion, the second continuum arm robot 302 can be fed through a second access passage 306 so that both continuum arm robots are within the same working space 307. The second continuum arm robot is directed to the first continuum arm robot, where it is able to clamp or connect to the first continuum arm robot with a connection mechanism 303. With the first and second continuum arm robots coupled, the actuator head of the first continuum arm robot is then able to use its tool or gripper such that it can work on the target object 304. In addition to the typical continuum robot tasks, the use of collaboration enhances particular machining and manipulation tasks. In addition, collaboration can be used for inspection tasks that require force interaction with the environment (e.g. ultrasonic inspection). The linking of the first and second continuum arm robots means that whilst working on the target object the first continuum arm robot is supported and as such undergoes less deformation than it would do if it were operating on its own. When the first and second continuum arm robots are to be removed the clamping between the robots is disengaged. This allows the first and second continuum robots to be removed along their respective entrance passages. The image shows the use of two access ports these could for example be borescope holes within a gas turbine engine or other complex system. However, the robotic arms can be used in any suitable entry port into the system. It is also not required that the two robotic arms use different entry paths, they could be inserted into the system adjacent to each other. The use of linked continuum arm robots means that the access to the working area can be less than 50 mm—the only size requirement is that it only needs to be large enough for the continuum arm to fit through. This means that linked continuum robots can be used in areas where it is not possible to access with larger industrial robots. As such, the system can be used in the technology fields of aerospace, nuclear power, oil and gas as well as communications—all of which have issues relating to access for robots and human engineers. As the skilled person would appreciate this is a non-inclusive list and the technology can be extended to be used in any suitable location.

In order to navigate the second continuum arm robot to the first continuum arm robot a camera system may be employed in the first and/or second continuum arm robot so that the operator can direct the head of the second continuum arm robot towards the first continuum arm robot. Alternatively or additionally, positioning sensors can be employed in both continuum arm robots that provides relative positional information back to the operator so that they can manipulate the robots relative to each other so that they can establish a suitable coupling. Suitable sensors may be cameras or depth sensors for navigation and can be used individually or combined. Magnetic sensors could also be incorporated. Additionally or alternatively, an optical fibre can be used for shape sensing. This could be done by linking the sensors in each of the first and second continuum arm robots so that they can provide the operator with accurate positional data regarding their location. Relative position controls can be used when the two robot arms are approaching each other. The two robot arms are both able, before coupling, to move independently to one another, however, once linked they may be controlled as a single system. Once connected, the control of the robotic system is performed through synchronized/coordinated control. The independent motion is due to them having their own actuators. This allows for accurate positioning of the second continuum arm robot, which is required because the coupling point between the first and second continuum arm robots determines the rigidity of the system. Furthermore, it can be used to control the level of movement that is available to the head of the first continuum arm robot. The control of movement is achieved by connecting the second continuum arm robot closer to the end of the first continuum arm robot, which limits the movement between the connection and the end. As such, if the operator connects the second robot close to the head of the first continuum arm robot it reduces the number of degrees of freedom of motion available to the first continuum arm robot, but it also reduces the flex in the system. This means that the positional control over the head is greater; thus, allowing either heavier objects to be moved or for use in processes were the head produces a reaction force such as during media spraying. As such, the system can work in confined spaces where if the head touches the side of the side of the object that it may cause damage to the object. Alternatively, this process can also be used to lock off degrees of freedom, so that the head can be controlled so that it can only be moved in a single plane—akin to a painter holding his wrist to produce a straight line. However, by connecting to the first continuum arm away from the head increases the flexibility and also the number of degrees of freedom available. As such, this can provide a more controlled continuum arm robotic system to work in areas that need greater dexterity. As discussed, the arms are able to connect "hold hands" so as to increase the support for the arm for performing the task. This allows the same sized continuum arm robot to perform heavier and stronger tasks than it would be able to without it. Having such a system may enable support for the head whilst performing tasks in which a force is exerted against the head of the arm carrying out the task such as spraying. In such a case the presence of the secondary arm acts as a brace. The use of such a system could prevent damage to the surrounding area from the robot head whilst performing such tasks.

In the example as presented in FIG. 3 the connection occurs at the head of the second continuum arm robot; however, the connection may occur at any suitable point along the length of the second and first continuum arms. The connection point may be determined prior to inserting the devices. Alternatively, the operator can determine the coupling point whilst positioning the continuum arm robots within the workspace. This allows the linked continuum arm robots to have separate functioning heads, which because of the linked arms has increased rigidity. The connection at points along the arm may for example be performed by having an electromagnetic clamp at a point along the continuum arm robot. This would allow for example for one head to be able to perform a repair task such as spraying whilst the second head could provide illumination and a camera system. Alternatively, the two heads could provide complimentary functions such as cleaning and repair. The presence of the two continuum arms within the system also increases the supply into the work area as fluids can be piped along the centre of the arms or along the periphery. Similarly, it is also possible to supply optical systems such as illumination and camera systems to the work area. Thus, by connecting further down the arms from the head allows for independent control of the two heads of the linked system; as such they retain full functionality of the end of the continuum arm from the point at which the two arms are linked. By having two heads that can perform different tasks within the same system increases the functionality of the robot system. It also means that multiple process can be carried out at the same time, which can reduce maintenance time on complex equipment and as such reduce its down time.

The arms of the robots can be connected by a number of different options. The connection system can be made by means of magnetic or adhesive coupling of the continuum arms together. Alternatively or additionally, the connection system can be achieved through mechanical, pneumatic or hydraulic clamping systems. The control of the connection system is linked to a connection control unit on the actuator pack which upon a signal the control computer program starts to initiate the process for connecting the second continuum arm robot to the first. For example, in the case of a hydraulic and pneumatic connection systems the connection control will control the fluid supply to the clamp to close the clamp around the arm of the first continuum arm robot. In an alternate example of using an electromagnetic coupling the connection control unit supplies the electromagnetic clamp with the requisite current to engage the electromagnetic clamp.

A control system is required to control the, at least, two arm continuum arm robotic system as shown in FIGS. 4a and 4b. The system presented in FIG. 4a shows a system in which the first compliant robot 401 and second compliant robot 402 each have their own local control systems 403 and 404 respectively. These control systems are used to provide signals to the actuator packs 405 and 406 which in turn are used to control the movement of the individual continuum robot. An overall control system links the two local controllers so as to provide overall control once the robots have coupled together. FIG. 4b presents an alternative in which the first compliant robot 401 and second compliant 402 robot have their own local control systems 403 and 404 for supplying signals to the actuator packs of the individual actuators 405 and 406 respectively. The local controllers are controlled (overridden), or bypassed when the robots are controlled by the external overall control system 407, which is coupled to the local controls and provides the required signals to them so that the system is operated as a whole. The local and/or overall control systems may be operated on computers having a processor and memory suitable for running a suitable control program. The computer also has means for a user input; this could be USB port connected to a joystick which the operator moves to control the motion of the robot. Additional functionality of the computer is desirable; this may include a second user input device such as a keyboard or through commands being entered through a touch screen device. Further functionality such as a mouse may also be used. The computer also requires a means of connecting with the actuator packs associated with the different continuum arm robots; this connection can be done through physical linking by the use of a cable or wirelessly. Further features of the systems depending upon their system configuration would be apparent to the person skilled in the art. The computer hosting the overall controller may also be the same system having the local controls. In such a case the local controls may be part of the overall control program but are only able to address a single actuator and control their own associated robot. Alternatively, the overall control system may be on a separate computer/computers to the local control systems for the robots. In such a case the computer hosting the overall control system can link with the computer/computers using any suitable means, with the signals being able to be read and transmitted by the overall control system. The local system can then provide and transmit the signals to their associated actuator packs.

A system having multiple linked continuum robot arms have three different operational modes. The first is a system in which all the arms remain active after coupling. Such a system would allow for the second or further robot in the system to either have a controllable head or for the second or further robot to move the first robot body position so that the head can be manipulated into a new position. The second way of controlling the linked robotic system is to have one or more active robots and the remaining robots having passive control. This allows for limited control of the second or further robots within the system, for example this may allow for a minor movement of the robot system so that they can access a greater range of areas of the workspace. The third option is to have one active robot and the other robots rigid/idle once they have coupled. This will mean that the second and further robots are used purely in a supporting capacity for the first robot. The choice of operating mode will need to be modelled as part of a kinematic modelling of the robotic system which is programmed into the computer. Having multiple moving robots increases the complexity of the model and the requirements of the system to be able to operate the system.

In order to achieve the desired system it is important to have a control system which is able to control the movement of multiple linked continuum arm robots within the system. Each continuum arm robot has its own controller which is linked to the actuator pack. These local controllers are then linked by an overall control system that is able to control the robots when they are in the coupled state. As such, the control system may be configured also to control the controllers linked to the first and second continuum robots when they are not linked, but the main purpose is the control of the system when linked. The overall control system is responsible for motion control, synchronisation and overall planning of the linked robotic system. As such, the local controllers for the first, second and potentially further compliant robots requires them both to have a synchronized clock whose signal is fed back into the overall control system of the robot. The overall control system is also responsible along with the local controllers for obtaining the feedback from the sensors provided within the robots, however, the overall controller takes the signal from all the robots whereas the local controllers only do it for their associated robot. The overall controller can process the signals and provide feedback of their readings to the operator via a visual display unit linked to the controller. The system may also be configured to provide an alarm if the sensors record any dangerous or erroneous signals. The alarm may be audible or visual in order to alert the operator. The sensor information is also used for computing the motion of the linked continuum robot system. Part of this information may be fed into kinematic models representing the system and the function of the robots so that accurate mapping of the system and plotting of path and or work can be accurately carried out. The kinematic modelling will need to accommodate the representative stiffness of the joints within all of the robots, bit also be able to compensate for the increase in stiffness of an associated joint. In addition to the modelling a feedback system may be used to constantly improve the modelling and to increase the accuracy of the models. This will take information from sensors and visually to increase the performance and usability of the system. Any determined movement is then fed as an instruction into the local control of the first or second robot so that this can be translated into a motion of the robots by their actuators. Furthermore, with this data the overall control can determine if any further corrections or compensations need to be automatically inputted into the robots to ensure the positioning s correct. Thus, in controlling any movement of the, at least, linked system the overall controller is responsible for and with signals sent to local controls associated with the actuator packs or directly to the actuator packs. The overall controller may also receive feedback from the actuators and or the local controllers for the first and second compliant robots. This allows the controller, and possibly the kinematic modelling, to be updated by the information regarding the individual controls of the compliant robots within the system. Although, the local controls are described as being separate to the overall control, they may be provided for on the same computer system which is able to address the robot actuator packs individually. In this case, each local controller has the functionality required to address the actuator controlling its respective robot and to both feedback information and to be controlled by the overall controller. Alternatively, separate computer systems may be used for each of the controllers. Although, the discussion is based around robots that are clamped together, the system may also be used to control the movement of two robots that are working on a linked job within a workspace. This could for example be used for an inspection system and a working tool or the use of a cutting tool and an ignition source for the cutting tool.

For the step of connecting the robots together there needs to be way of coupling the robots without damaging each other as the contact and grip/another one another. For this to happen the control can have a relative motion control; this allows one or both robots to have a controlled movement once they are in a desired position close to each other after the above described second step. The controlled motion can either be carried out by an operator using visual or sensor signals to determine the position of the robots relative to each other. Or alternatively, this can be carried out through the pre-programmed operation of the robots by the control system which uses information from sensors to guide the robots together. In order for this to occur the robots may have one or more positional sensors that allow the position of the robot and/or its position relative to the other robots in the system to be determined; this can be fed to the overall controller so that it can use these signals to monitor and control the motion of the robots. The system may also be provided with a camera on the connection mechanism so that the connection process can be seen by the operator, which in the case of automatic coupling may have a manual override the process if they see that there is a fault. This camera may be part of a vision odometry system. The overall control can use a predictive coupling based upon kinematic models of the different robots within the workspace expected properties and their movement and motion being modelled together to determine contact points. This modelling can again further be improved by having an open loop in which the sensors, which can measure position and/or shape are used to compensate the model so that this provides a more accurate reconstruction of the actual behaviour of the robots. If the clamping mechanism is a magnetic clamp then it will require less control as the robots can be placed close to the other and active to bring the robots into clamping connection. Not only is the motion approaching coupling important, so is the clamping process, which again can be controlled by the overall control system.

Once the robots have been moved into position the clamping process can begin. This can be automatic based upon the modelling and automatic programming within the overall controller. Alternatively, it can be based upon an operator signal once the operator is satisfied that the robots are correctly positioned in order to be clamped. If they are not correctly positioned the operator can take over manual control of the robots through the overall controller or local controls to correct the final part of the positioning for coupling. With the robots being in the correct position they can then be clamped. As discussed above, depending upon the number of robots within the system, the clamping of the first and second robot may occur first followed by a second clamping process for the second and/or first with the third robots. The order may also be dependent upon the size of the associated robots. In this case the operator and/or the overall control program may have to compensate for any deflection of the robots after the first coupling process prior to the second clamping process or the system may already be in position. The robots are thus either automatically or manually activated to clamp with each other. In the case of an electromagnetic clamp, it is less complex than having a wraparound clamp, but the activation either manual or automatic initiates the clamping process of engaging the clamping means to grip another robot in the system. Once the connection has been made it can be checked to see if it has been clamped correctly. This can be done through the use of one or more sensors, such as pressure sensors on the clamp and/or on the clamping area. Additionally or alternatively the system can have a closed circuit loop to determine if there is a connection between the robots. Additionally or alternatively, to the other means described their may also be a camera system positioned near the clamp so that a visual feedback can be provided to the operator. With the robots within the system clamped a force can be exerted onto one or more of the robots to ensure that the clamping is secure. This could be a small movement or may apply a predetermined force or torque on the clamped robots. The predetermined force may be equivalent or greater than the expected force that will be applied to the clamping area during the performance of the task. If there are more than two robots within the system then the forces may be applied according to the expected level of force at each point and the movement/force may be applied individually or all together. This can form part of a check sequence that the overall controller goes through to ensure that the system is safe. For example, the system may determine the readings form the sensors within the clamping region to see if they are within a predetermined range. It may then determine the voltage through the system to check the closed loop system. If both of these are acceptable it can then apply the force at the clamping points as a final check. If the values of one or more of the sensor, voltage and/or applied force are not within the predetermined values the system may automatically be programmed to disengage the clamp so that the previous two steps can be performed again to obtain a more secure clamp. If they are within the predetermined value range, then the task can be performed by the tool on the robot. The overall control system may monitor the closed loop voltage and/or the sensor values during the performance of the task, this can act as an interlock on the system and if the values fall out of the correct level the system can be shut down to prevent damage of the workplace and/or robot. Once the robots have been connected one of the robots can be powered down into its idle state.

In a similar way to the connection sequence, the disengagement sequence needs to be checked so that robots and the workspace in which they are operating do not get damaged. The initial step in this process is to check to see if it is safe for the robots and/or the workspace for the robots to be released. If not further movement of the robots is required to position them in a safe location so that they can be disengaged. Depending upon the number of robots within the system the order of disconnection may vary; this could be dependent upon the size, function and/or functionality of the robots within the system. If the robot has been idle, because it has been used as part of a supporting role then it can be activated. With all of the robots in the system activated to their abilities, the clamping mechanisms can be disengaged. This can be either via an operator instructing the overall control system to release the clamps or automatically through the overall control program. Once the robots have been released the system can undergo a series of checks to determine that the disengagement process has been successful. This may be reading the voltage from the closed loop system and/or taking/receiving signals form the sensors around the clamps and/or the positional sensors that were used for the positioning the robots prior to coupling. At this point the robots will be under control of their local controller and as such can be manipulated individually, to make extraction of the robots more straightforward. Once it has been determined that the robots are no longer clamped and are safely disengaged, they can then be removed from the workspace. With the robots outside of the workspace they can be powered down and stored.

Once the robots are positioned close to each other in their desired positions or when they are engaged does the at the very latest the overall control system take over operation of the system. As soon as robots are engaged the motion and control is governed by the overall controller. In cases of more than two robots in the system then there may be a hybrid system operating in which the two clamped robots are controlled as a single entity by the overall controller, whilst the third robot or further may still be under local control. When the system is clamped the overall control will have a preprogramed setting for the nature of the system, whether the robots are to be passive, idle or active. With this information the overall controller can turn off the power to a passive robot as for the time of use it is not requiring any additional power. Alternatively, it may only provide power to the functional requirements of the robots such as sensors and clamping circuitry. The overall controller at this point will also become responsible for data collection from the sensors and/or the cameras on the robots dependent upon their functionality. The types of robots that may be employed for such linked robotic systems are: blind robots having no sensors—these may just have a functional tool at the end, observer robots, which only have sensors and/or cameras—for example borescopes; and hybrid robots having both tools and sensors. Examples of such systems could be an active robot being used to drive a passive one, having two or more active robots within the system or having a blind robot guided by a passive one.

The key features of the overall control system are that it needs to be able to control multiple robots together. It does this by utilising the local controls for the robots within the system and linking the outputs to them to the overall system movement or by replacing the local controls and providing direct signals from the overall control to the actuator packs which govern the movement of the robots. As part of this the overall control must receive synchronise clock signals from the robots and their controllers; this allows the system to be able to link the feedback signals from the actuators and/or the sensors from the robots and to be able to determine the effect on the multiple robots within the system. This can allow for accurate feedback-based modelling of the motion and position of the robots as well as the ability to be able to send synchronised signals to the actuators to move the robot in a coordinated way. The movement of the system needs to be coordinated to allow the robots to operate in a safe and secure way when linked. The other issue that the overall controller needs to account for is redundancy management between the robots. This means that the overall control system needs to be able to shut down the motion within certain degrees of freedom in one or more of the robots once they are connected. The reason for this is that the clamping results in a locking point; this inherently reduces the available degrees of freedom available to the system. If the overall controller did not account for this than there is a potential for damage to one or more of the robots. For example, if the second robot grabs the first robot at the head of the second robot then the system will lose six degrees of freedom, and as such six of the motors within the actuator will be providing contradicting signals to another 6 motors used to drive the one or the other robot. The lost number of degrees of freedom is not fixed, but depends upon the nature of the clamping, as such if a robot connects with two other robots then at one connection it may lose a different number of degrees of freedom to the other point of contact. This, therefore, needs to be accounted for and the overall controller must manage this so that it is not inputting conflicting information into the actuator packs. As such the system needs to be able to process the movement command of the robot system and to feed any further motion into a coordinated set of motors in one or more of the actuators so as to achieve the motion without providing conflicting advice to the different motor banks within the actuators. The overall controller has a number of options for overcoming this: Firstly, it can deactivate certain motors within the actuators for each of the robots so that no conflicting signals are sent, this could be part of a power down of that motor or not providing any signals. The overall controller can be programmed to deactivate an appropriate number of motors from each actuator, so this could all be from one actuator or a specific number from each actuator bank—for example 3 and 3 or 4 and 2 or 5 and 1 in a system that loses 6 degrees of freedom. Secondly, the signals to the actuator banks can be provided so as to be co-ordinated, so that the movement of the actuators avoids conflict. This may be by compensating for any conflicting signal, by modelling of motion of the system so that conflicts are determined and compensated for in the inputs to the actuator. The overall control may be able to switch between the two modes so that for example under automatic motion the system is compensating, but under manual control by the operator the system shuts down banks of motors within the actuator. This is also where the synchronisation between the controllers is crucial so that the overall controller is providing the signals in a synchronised way to the respective actuator packs, therefore, the motion of the motors is linked and synchronised. If the system is operating off a kinematic model, as discussed above, the overall controller must also account for the size weight and flexibility of the robots in the system, so as to provide an accurate model. This can then be fed into the signals that are applied to the actuators to control the motion of the robots. The overall controller may be programmable so that the system is able to provide a compensatory force to one of the robots when they are performing the task, this can be to increase stiffness or to increase the accuracy of the positioning of the head of the robot, when it is performing the task. The overall controller is responsible for the system carrying out the desired task. Therefore, it is responsible for sending the signals to the robot actuators for supplying the tool and or any equipment and/or supplies that the tool needs to perform its task.

The program controlling the overall controller and/or the local controllers may, be linked to an imaging device in the one or more continuum arm robots, for example this may involve one or more of the arms having a fibre optic camera with its output fed into a decoder whose signal is fed into the computer and into the program so that the operator can have a live (real-time) view of the operation of the continuum arm robots in situ and from this they are able to steer the robot into position. The computer program also has an input to allow the connection system to be operated when desired. The output from the computer program is then transmitted to the actuator pack in order to control the output of the continuum robot. The actuator packs associated the continuum arm robots features an input which is able to link to the computer, this may be the presence of a cable jack for the insertion of a networking cable or the presence of a wireless transmission card, or both. These are coupled to a processor within the actuator pack. The processor is coupled to an encoder which is used to control the movement of the actuators. The actuators within the actuator bank of the actuator pack may be paired. The actuators must be capable of producing accurate controlled movement and sufficient torque to move the tendon so as to move the joints within the continuum arm. The actuators can be brushless servo motors. Such servo motors provide the benefit of being lightweight, whilst still producing the torque and the accuracy of movement control that is required for accurate positioning of a continuum arm robot. Alternatively, they can be any other suitable actuator that would be apparent to the person skilled in the art. The actuators may be mounted to a frame allowing the actuators to be connected into a bank which when combined with other paired actuators in frames can be linked to form the actuator pack. Drive electronics of the actuators are coupled to the actuators to control their movement. The actuator pairs may also be provided with a load cell, which is able to measure the load on the actuator and provide a signal of the relative load back to the servo drive which are used to controls the individual actuator. Thus, accurate control of the actuator can be obtained. The movement of the individual actuators sets the tension within the within the tendon in the arm. Controlling the tension results in movement of the respective joint within the arm which causes a deflection of the arm position from being straight. Through this it is possible to manipulate the robot and the head into the appropriate position. The second continuum arm robot and its actuator differ from that of the first continuum arm actuator as the second continuum arm robot also features the connection controller mechanism for allowing the second continuum arm robot to connect with the first continuum arm robot. Although the example has been described for cable operated continuum arm robots, it is also possible to use non-cable driven systems such as pneumatic, hydraulic, with electric motor-controlled continuum arm robots.

The method of operation of the robotic system is represented by the flow chart in FIG. 5. The first step is to insert the first and second and any further compliant robots into the workspace. This can be done one at a time or simultaneously depending upon the nature of the workspace that the robots are to be inserted into and the accessibility of the workspace from different access ports. The access area may be an access port such as a borescope in a gas turbine engine, or another limited space access area. The second step is to control the relative position of each of the robots within the system so that they are positioned at their desired position near to the relative task that they are set to perform. For example, if there is only a two-robot system with a first robot having a working head and a second robot having a gripping head, so that the second robot only functions to support the first robot. The first robot is positioned so that its head is close to the task that is needed to be performed whilst the head of the second robot is moved into position close to the gripping point of the first robot. In the case of a non-gripping system the first robot will be moved to the desired area to perform the work and the second robot will be moved to be positioned proximate to it. As the skilled person will appreciate depending upon the number of robots in the system and their functionality and gripping there is a number of ways in which the different robots can be positioned relative to each other; this is also with respect to the gripping options of the different robots. With the robots positioned proximate to their desired position if desired they can now be connected. Depending upon the number of robots in the system and the number of clamping systems of the robots the sequence of connection may vary. The simplest is the two-robot system described above in which case the second robot clamps the first robot. The final stage for connection may be controlled by addressing the individual robot controller or utilising the overall robot controller. For simple systems and minimal connections it may be more simple to utilise the local robot controller, but if a robot is required to clamp with more than one robot then the overall control system may be more appropriate as this is able to control the whole system. With the robots connected the third step is to have controlled motion of the robots; this is governed by the overall controller and allows the desired number of robots within the system to perform their desired tasks. This could involve more than one robot being used in the same task or providing simultaneous jobs on the same area of the workspace. Alternatively, one could be used for visual inspection whilst another head performs the task. Once the task is performed the overall controller can then be used to provide a co-ordinated separation of the robots, so that each individual robot is back under the control of the local controller. Again, the separation sequence will depend upon the number of robots within the system. In a system comprising more than two robots it also may be that one of the robots can be disengaged, so that it can be removed from the system and replaced by another robot having different functionality. For example, a three-robot system may at first comprise a clamping robot, a borescope, and a grinding robot. The system will clamp all of the robots into position prior to the grinding operation, once this is completed the clamping robot releases the grinding robot so that it can be removed. A coating robot may then be inserted into the workspace and positioned relative to the clamping robot and the desired area for the coating to be applied. The clamping robot can then grip the coating robot so that it can perform its desired task. With this complete the robots can then undergo the separation sequence. Once all of the robots are disconnected, they can then be retracted from the workspace into their original positions.

FIG. 6 presents an example of a three-continuum robot system. In this the first continuum arm robot 601 extends from its actuator pack, which is positioned on the outside of the workspace, to the tip 604 which is required to perform the requisite task of the robot system. A second continuum arm robot 602 extends from a different access port, again with the actuator pack being placed outside of the workspace and the continuum arm robot extending into the workspace with at its tip the second continuum arm robot having a shaped two piece pincer clamp 605 that is used to engage around the body of the first continuum robot and clamp it in position. A third continuum arm robot 603 is also present in this example. The presence of a third continuum robot provides extra support for the first continuum arm robot, which will enable the first continuum arm robot to support a greater load than it could do on its own or with just the second continuum arm robot alone. Like the first and second continuum arm robots the actuator pack of the third continuum arm robot is located outside of the workspace. The third continuum arm robot extends is shown to extend to the first continuum arm robot where it clamps/grips it using an electromagnetic clamping mechanism 606, which engages with a magnetic section of the first continuum arm robot 607. The tip of the first continuum arm robot is thus free to perform the requisite work task within the workspace. An alternative for a three robot system would be that the first and third continuum arm robots have functional heads that can be used for a purpose, whilst the second continuum arm robot features two clamps so that it can engage with the first and third continuum arm robots. Thus, the second continuum arm robot acts as a brace for the first and third continuum arm robots.

FIG. 7 presents an example of the clamping mechanism between the second and first continuum arm robots as presented in FIG. 6. The clamping mechanism 703 is positioned at the end of the second continuum arm robot 702. As the second continuum arm robot is moved closer to the first continuum arm robot 701 the operator ensures that the connection system is in the open position; this is to ensure that the connection system can be positioned with respect to the first continuum arm robot without damaging the first continuum arm robot. It also means that it is already in a position to connect the first continuum arm robot. Once the connection system is positioned around the first continuum arm robot the operator can initiate a signal to close the connection system so that the first continuum arm robot is held by the second continuum arm robot. Sensors, such as pressure sensors may be applied to the connection system to inform the operator that there is contact at a or multiple points of the connection system and that the connection system can safely be closed. To release the operator issues a command to open the connection system, so that the second continuum arm robot releases the first continuum arm robot. The behaviour of connection system can be rigid. In this case it is possible to achieve a connection with high stiffness. Alternatively, the connection system can be compliant, such that it has a lower stiffness, but with higher flexibility and exhibits elastic behaviour. Furthermore, the connection can constrain less than six degrees of freedom, allowing one or more relative motion modes between the robots. In this case, the connection would be equivalent to a revolute, universal, spherical, prismatic, or other joint instead of behaving as a fixture. As discussed above one of the continuum arm robots may be a compliant partially robotic arm rather than a compliant robot. In this case, it will still be associated with its own actuator pack and will operate in the same way as if it were a continuum arm system apart from having less control over the positioning and the motion of itself.

FIG. 8 presents an example of a control system for in which a third robot is supplied into the workspace. In this first compliant arm robot 801 is provided along with an associated actuator pack 802, which has the electronics and electromechanical devices to control the compliant robot and to activate the tool. This is actuator pack is coupled to a local controller 803, which is used to move and manipulate the robot when it is operating individually. A second compliant robot 804 is provided along with an associated actuator pack 805, that is coupled to its own local controller 806. The second complaint robot clamps to the first compliant robot using a clamp 807. These two robots are linked by an overall controller 808. A third compliant robot 809 is provided into the system. This compliant robot has its own actuator pack 810 and local controller. In this case the third complaint robot is not coupled the control of the overall controller of the first and second compliant robot, however, the local controller of the third compliant robot is linked to the overall controller and provides sensor and positional data to the overall controller. This allows the computer program that runs the overall controller to know details regarding the third robot and the signals that it is provided from the sensors. This can be used as part of a feedback system so that the overall controller has as much information as possible regarding the system. In such a case the third compliant robot may not be solely a flexible robot having, for example a borescope. As such, the motion of the third compliant robot is not controlled by the actuator pack and it local control, which is only used to obtain the video signal from the borescope camera. The first compliant arm may be provided with a clamp to engage with this third complaint robot.

Although, in the above-described examples the system is shown having two linked continuum arms, it is possible to have three or higher number of continuum arms linked together in the system. By increasing the number of arms within the system allows the system to have a greater degree of functionality.

It will be understood that the invention is not limited to the embodiments above-described and various modifications and improvements can be made without departing from the concepts described herein, Except where mutually exclusive, any of the features may be employed separately or in combination with any other features and the disclosure extends to and includes all combinations and sub-combinations of one or more features described herein.

We claim:

1. A control system for a compliant robotic system comprising at least two compliant robots each compliant robot having their own actuator pack, the control system comprising:

an individual local control system associated with each of the actuator packs, the local control system providing control signals to the actuator packs to cause movement within the at least two compliant robots, an overall control system which controls the overall motion of the robots when the robots are proximate within a workspace, the overall control system providing signals collectively defining an overall control to the actuator packs associated with the at least two compliant robots, so as to cause linked movement of the compliant robots, wherein the overall control system includes receipt of synchronized clock signals from the compliant robots;

wherein each individual local control system is provided with a clock, and the clock of a respective individual local control system is synchronized with the other clocks, and wherein the overall control system is provided with a redundancy control system that limits the motion of the compliant robots within certain degrees of freedom, so that the motion of the at least two compliant robots does not conflict when operating under the overall control system, and wherein the at least two compliant robots include a first compliant robot and a second compliant robot, and the second compliant robot includes a connection mechanism that is configured to grip the first compliant robot at a plurality of positions along the first compliant robot.

2. The control system according to claim 1, wherein the connection mechanism is controlled by either the local control system associated with a robot arm provided with the connection mechanism or the overall control system.

3. The control system according to claim 2, wherein the connection mechanism is provided with an interlock, which if broken restricts the movement of the robotic system, and when connected initiates the redundancy control system.

4. The control system according to claim 1, wherein the compliant robots are provided with sensors that provide signals to both the local control systems and to the overall control system.

5. The control system according to claim 1, wherein the local control systems are programmed with a kinematic model of the respective robot in motion, which is used to compensate the signal to each actuator pack when a movement command is inputted.

6. The control system according to claim 1, wherein the overall control system is provided with a kinematic model for all of the robots within the system, as well as models for connected systems, which are used to compensate the signals provided to the actuator packs when a movement command is inputted.

7. The control system according to claim 1, wherein each local control system and the overall control system are provided on separate computer systems, with the local control systems being linked to the overall control system.

8. The control system according to claim 1, wherein the local control systems and the overall control system are provided on the same computer system.

9. The control system according to claim 1, wherein the redundancy control system disengages a required number of motion control actuators from one of the actuator packs.

10. The control system according to claim 1, wherein the redundancy control system disengages a required number of motion control actuators from each of the actuator packs.

11. The control system according to claim 1, wherein once the robots are in position the overall control system places one or more of the compliant robots into an idle state, whilst at least one of the compliant robots remains active, such that an operator controls the motion.

12. The control system according to claim 1, wherein once the robots are in position the overall control system places one or more of the compliant robots into a passive control state, whilst at least one of the compliant robots remains active, such that an operator controls the motion.

13. A method of controlling the compliant robots in the control system according to claim 1, the method comprising:
inserting the compliant robots into a workspace,
manipulating the movement of the compliant robots using the individual local control systems to move the compliant robots to a first desired position,
with the compliant robots in the decided position each local control system is shut down and the overall control system takes over the motion control of the compliant robots,
performing a decided task using the compliant robotic system,
positioning the robots to a second desired position,
disengaging the overall control system and reengaging the local control systems, and
removing the compliant robots from the workspace.

14. The method of claim 13, wherein once the compliant robots are in the first desired position the compliant robots are clamped together using the connection mechanism, and the connection mechanism is disengaged once the compliant robots are in the second desired position.

15. The method according to claim 14, wherein once the compliant robots are in the first desired position a preprogramed connection sequence is activated which provides an automatic control for clamping the compliant robots together.

16. The method according to claim 14, wherein once the compliant robots are in the second desired position a separation sequence is activated, which provides a means of automatically separating the robots and deactivating the overall control system.

17. The method according to claim 14, wherein once the compliant robots are clamped together, the overall control system places at least one of the compliant robots in an idle state and at least one of the compliant robots in an active state.

18. The method according to claim 14, wherein once the compliant robots are clamped together, the overall control system places at least one of the compliant robots in a passive state and at least one of the compliant robots in an active state.

19. The control system according to claim 1, wherein once the robots are in position the overall control maintains all robot arms in an active state.

20. The control system according to claim 1, wherein the redundancy control system is configured to limit and shut down the motion of the compliant robots within the certain degrees of freedom once the compliant robots are connected.

21. The control system according to claim 1, wherein the connection mechanism includes a camera.

* * * * *